Figure 1:
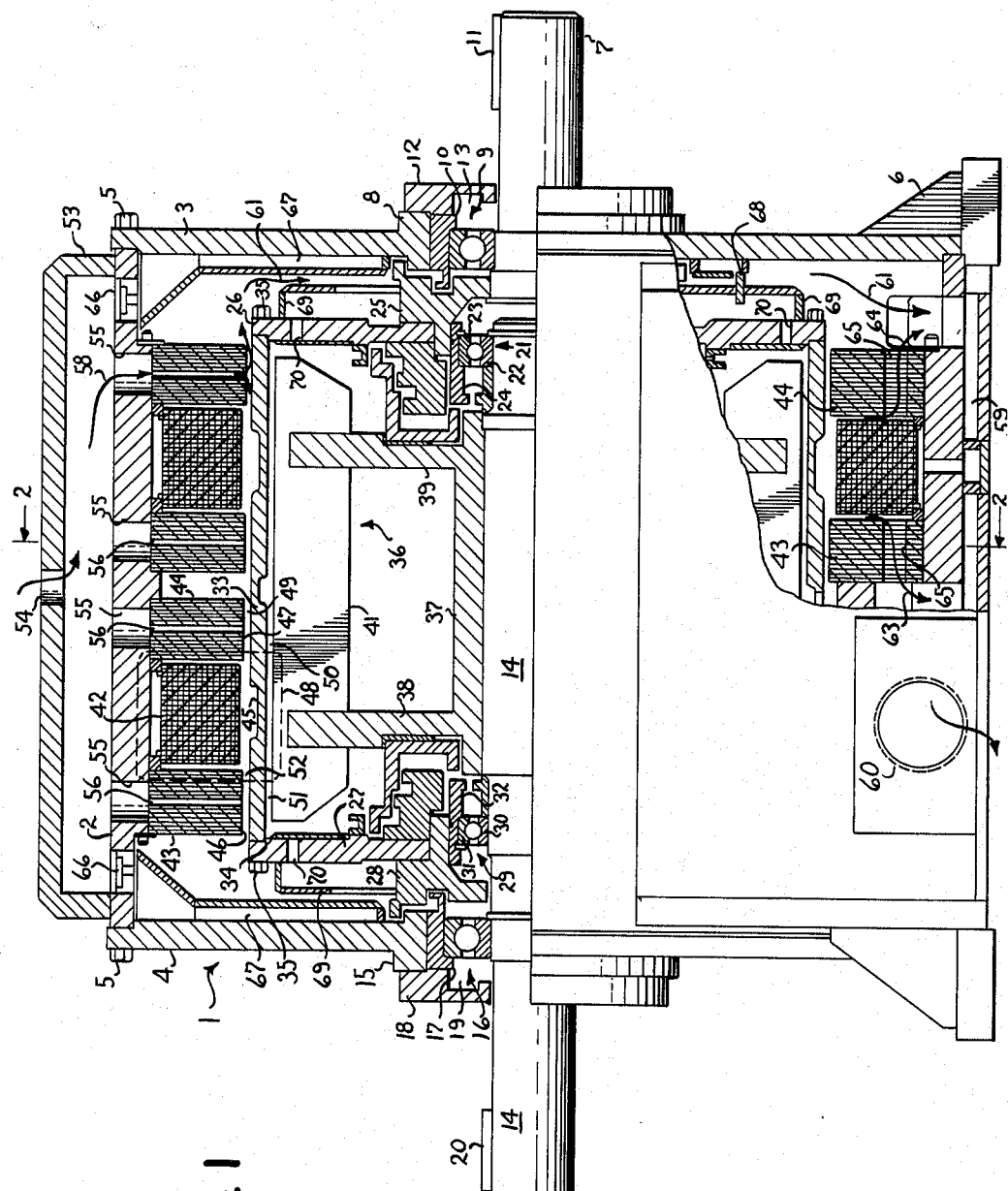

INVENTOR.
KENNETH R. McDOUGAL
BY Robert H. Montgomery
ATTORNEY

United States Patent Office 3,249,778
Patented May 3, 1966

3,249,778
EDDY CURRENT COUPLING
Kenneth R. McDougal, Erie, Pa., assignor to General
Electric Company, a corporation of New York
Filed Sept. 1, 1961, Ser. No. 135,633
4 Claims. (Cl. 310—105)

This invention relates to eddy current couplings, and more particularly relates to an eddy current coupling having a fast torque response.

An eddy current coupling in one form may comprise a stationary field assembly including an exciting coil carried on the machine housing, a rotor member having longitudinally directed pole-forming teeth on one shaft and an intermediate cylindrical drum. When the field assembly is excited, flux concentrations are produced in the eddy current drum adjacent the pole-forming teeth which generates eddy currents therein. These eddy currents produce magnetic fields which, upon rotation of the drum, cause the magnetized poles of the rotor member to attempt to follow rotation of the drum, and hence produce a torque on the rotor shaft.

When the voltage applied to the exciting coil of the field assembly is varied, the inductance of the coil causes the change in exciting current to lag the change in voltage. There is an additional significant lag in torque response of the rotor upon change in excitation which is primarily due to eddy currents generated in the rotor poles by change in excitation. Additionally, the pole-providing rotor member is usually made of a solid core of magnetic material with longitudinal recesses provided therein to define longitudinal poles therebetween. This construction provides a rotating mass of high inertia which resists changes in speed or torque commanded by change in field excitation.

These limitations of eddy current couplings in responding to changes in field excitation are recognized by those skilled in the art, and where high speed of response and low percentage speed regulation are essential, electric drives using easily controllable direct current motors are usually used. However, eddy current couplings have an attractive advantage over direct current motors of comparable rating, which is lower cost, and therefore would be preferable where an eddy current coupling would do the job.

One eddy current coupling structure heretofore proposed to reduce response time of the coupling output shaft to change in excitation by reducing the inertia of the output shaft utilized the poled rotor as the driving member and reduced the mass of the driven member by using a thin solid copper drum on the output shaft. The use of copper adds expense to the machine, creates manufacturing difficulties in forming and supporting the copper drum on suitable brackets to be attached to the output shaft, and further, a copper drum is dimensionally unstable at high temperatures and under rotational stresses.

This invention provides an eddy current coupling having an improved torque response time with change of excitation which uses all magnetic members, and further provides a poled rotor member of reduced inertia. Accordingly, it is a primary object of this invention to provide an eddy current coupling having an improved torque response characteristic with change in excitation. Another object of the invention is to provide a driven eddy current member structure having both improved electrical and mechanical response to change in excitation of the exciting member of the eddy current coupling.

Briefly stated, the invention comprises in one form thereof an eddy current coupling having a stationary exciting structure having pole rings formed of radially oriented laminations, and a poled rotor member having a plurality of individual pole members supported on a rotor hub, each pole member being formed of magnetic laminated sheet material with the laminations oriented longitudinally of the machine. The magnetic structure provides improved electrical response, and the mechanical structure, by virtue of the individual pole members, has a relatively low mass.

The novel features of the invention are pointed out with particularity in the claims annexed to and forming part of this specification. However, the invention may be best understood by reference to the following description in conjunction with the drawings wherein FIGURE 1 illustrates, partly in section, an elevation of an eddy current coupling embodying the invention; and FIGURE 2 is a view along line 2—2 of FIGURE 1.

Figure 2:
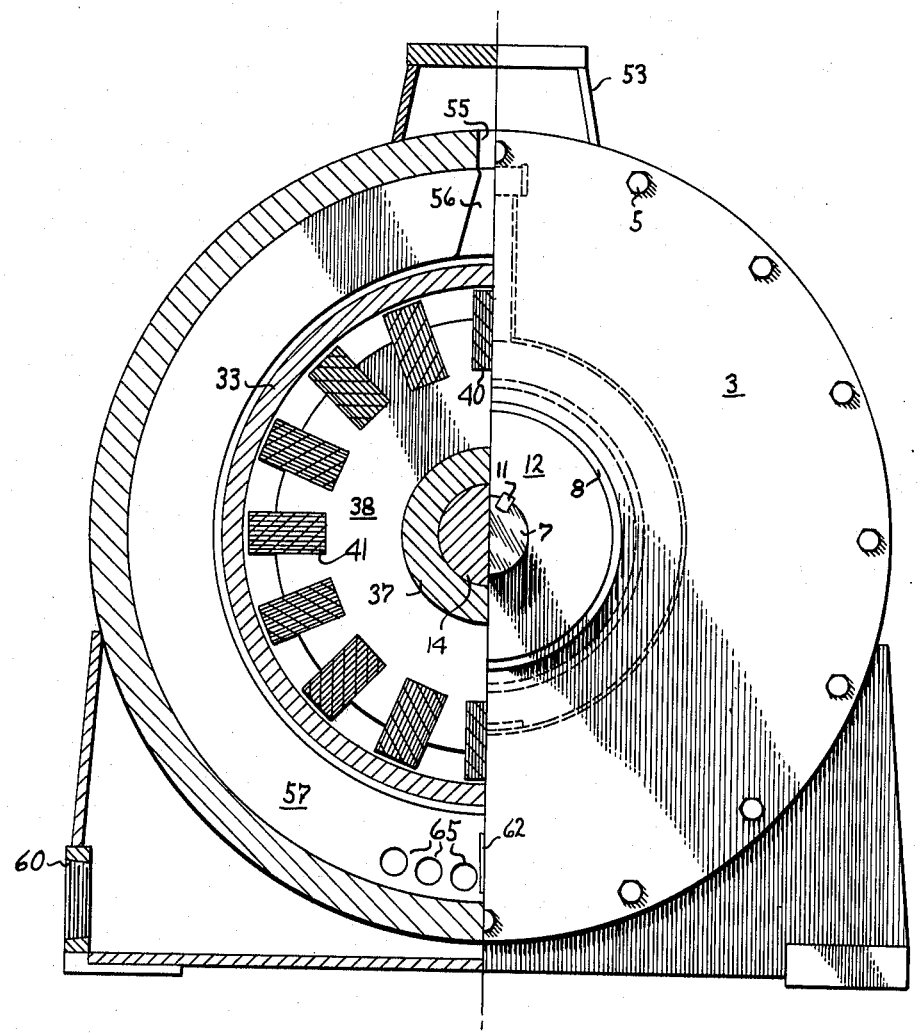

Reference is now made to FIGS. 1 and 2, which illustrate an eddy current coupling comprising a housing member 1 which includes an annular frame member 2 with annular end frames 3 and 4 secured thereto, each by a plurality of bolts 5. The housing member 1 is secured to and supported by base 6.

A shaft, normally the driving or input shaft 7, is rotatably supported in a bearing support bracket 8 defined in end frame 3 by a bearing assembly 9. A sealing member 10 may be positioned between bearing assembly 9 and bracket 8 for purposes hereinafter explained. The shaft 7 is adapted, as exemplified by key 11, to be coupled to the shaft of a prime mover, not shown. Member 12 is secured to end frame 3 to help define a lubricant-retaining cavity 13 about bearing assembly 9.

A second shaft, normally the driven or output shaft 14, is rotatably supported in a bearing support bracket 15 defined in end frame 4 by a bearing assembly 16. A sealing member 17, similar to member 10, is also provided between bracket 15 and bearing assembly 16 for purposes hereinafter described. A member 18, similar to member 12, is secured to end frame 4 to help define a lubricant-retaining cavity 19 about bearing assembly 16. A key 20 may be provided in shaft 14 to aid in coupling shaft 14 to a driven load.

The end frames 3 and 4 and associated bearing support brackets, sealing members and cavity-defining members, for economy of manufacture, are preferably made identical.

The shafts 7 and 14 are axially aligned and made mutually self-supporting by means of pilot bearing assembly 21 having an inner race 22 and an outer race 23. Inner race 22 is non-rotatably mounted on shaft 14 for rotation therewith, and outer race 23 is non-rotatably mounted within annular bearing cartridge 24 for rotation therewith Cartridge 24 defines a lubricant-retaining cavity about bearing assembly 21 and facilitates assembly of the shafts 7 and 14 as disclosed and claimed in the copending application of Guy D. Bradley, Serial No. 71,789, filed November 25, 1960, and assigned to the same assignee as the present invention.

An annular drum support member 25 is secured to input shaft 7 and rotates therewith. The drum support member 25 also rests on bearing assembly 21. Support member 25 has secured thereto annular drum support ring or bracket 26. If desired, the support member 25 and bracket 26 may be made integral. A similar drum support ring or bracket 27 is carried on drum support member 28, which in turn is carried on bearing assembly 29. Bearing assembly 29 has an inner race 30 mounted on output shaft 14 and outer race 31 non-rotatably mounted within bearing cartridge 32, upon which the drum support member 28 rests. The bearing cartridge 32 is similar to bearing cartridge 24 at the opposite end of the machine. The inner race 30 rotates with output shaft 14, and outer race 31 rotates with bearing cartridge 32, drum support member 28 and drum support ring 27. Drum support rings 26 and 27 support a generally cylindrical eddy current drum 33 which may be mounted on support rings 26 and 27 by virtue of shoulders 34 and secured thereto by a plurality of bolts 35 at either end thereof. It may thus be seen that the drum 33 is supported on and driveably connected to input shaft 7 at one end of the machine and further supported on output shaft 14 at the opposite end of the machine and adapted to have relative rotation with output shaft 14.

Within the inner periphery of the drum 33 a rotating pole structure 36 constructed in accordance with the invention is mounted on output shaft 14 for rotation therewith. The rotating field structure comprises a hub portion 37 secured to the shaft 14 with annular pole-supporting members 38 and 39 extending therefrom. The pole-supporting members have cutouts or slots 40 (FIG. 2) spaced about their periphery to receive and support longitudinally extending pole members 41. For reasons hereinafter explained, the rotor pole members are laminated, as illustrated in FIG. 2, and individually formed and supported as illustrated to provide a rotating pole structure of low inertia as compared with previously used rotating pole structures which comprise a solid core of magnetic material with longitudinal pole-forming teeth extending radially therefrom and defined by longitudinal recesses. The rotor pole members are formed of laminated plates of magnetic material which are oriented longitudinally of the machine. By way of example only, in a machine of the type illustrated having pole members approximately 17½" long, each pole member is formed of ⅟₁₆" stock laminated to a thickness of 1¾". The pole members may be formed by clamping the plates together, which are then secured by a plurality of beads of weld transverse to the direction of orientation of the laminated structure. Aligned recesses may be provided in the plates to provide weld material receiving grooves.

The housing member 2 carries magnetic flux-producing and conducting means, which comprise an exciting coil and a pair of magnetizable pole rings. In the machine illustrated, two identical flux-producing and conducting means are utilized. However, for simplicity of illustration only, one is numerically identified and described. Each comprises an exciting coil 42 encased in a suitable water-tight casing, not shown, and a pair of magnetic pole-forming rings 43 and 44 magnetically coupled to frame member 2. The pole rings 43 and 44 are formed of annular laminations of magnetic plate material with the laminated plates oriented radially with respect to the longitudinal axis of the machine. The pole rings 43 and 44 are, for example, formed of ⅟₁₆" magnetic plate material. Leads, not shown, for the coils 42 are brought out to suitable terminals or conduit box, not shown, on the machine housing, and the coils 42 are so electrically connected as to provide proper direction of current flow therethrough when excited. It will be understood that an eddy current coupling utilizing two field coils 42 is shown by way of illustration only. An eddy current coupling embodying the invention could utilize only one field coil or more than two field coils, and could also include an eddy current brake. It will be noted that annular grooves 45 are provided in drum 33 beneath each of the coils 42. The grooves 45 provide a restricted area of iron in the drum between surfaces 46 and 47 of rings 43 and 44 respectively. Therefore, when the coils are excited, the restricted area of iron in the drum 33 between the surfaces 46 and 47 at grooves 45 will saturate at low flux magnitudes and prevent short-circuiting by drum 33 of magnetic flux set up by the coils 42. An alternative construction would be to separate the cylindrical drum 33 into axial sections and secure a non-magnetic member such as a ring of stainless steel therebetween to magnetically isolate the portions of the drum under the surfaces 46 and 47. When the coils 42 are excited, a toroidal flux pattern is set up as indicated by the dashed lines 48. It will be noted that a magnetic circuit is provided about each coil 42, but described only in conjunction with the left hand coil. Each magnetic circuit comprises a pole ring 44, gap 49, defined by surface 47 of ring 44 and the outer periphery of drum 33, drum 33, gap 50 defined by the inner periphery of drum 33 and the outer radial edge of a flux-concentrating pole member 41, a portion of the length of poles 41, gap 51 between drum 33 and pole member 41, drum 33, gap 52 between drum 33 and surface 46, pole ring 43 and the annular housing 2 of the eddy current coupling.

In operation of the coupling, when the field coils are excited and shaft 7 is rotated to rotate drum 33 at a substantially constant speed, magnetic flux will exit from a ring 44, enter drum 33 and be concentrated at the inner surface of drum 33 at poles 41. Magnetic flux will then travel along a portion of the length of poles 41 and return to the mating annular ring 43 through drum 33. The flux concentrations entering and leaving the inner surface of drum 33 produces eddy currents therein. The flux entering and leaving the poles from north and south magnetic poles in flux-concentrating poles 41, as indicated by the letters N and S. The interaction between the generated eddy currents and the magnetic poles of pole members 41 cause the pole members 41 to attempt to follow rotation of the drum 33, thereby producing a torque on the pole members 41 and hence the output shaft 14. The degree of magnetic coupling between the drum and poles 41 can be controlled by controlling the excitation of the stationary field coils 42.

When the control voltage applied to coils 42 is changed, there is a corresponding change in exciting current which causes a change in the magnetic flux produced by the coil. A change in the magnetic flux indicated by dashed lines 48 tends to create a voltage in the pole rings 43 and 44 and pole members 41. However, since the pole rings 43 and 44 and pole members 41 are laminated in the direction of the magnetic flux, the orientations of the laminated structures suppress eddy currents in the pole rings 43, 44 and pole member 41. Therefore, essentially no reactive magnetic field is set up in opposition to the change in the magnetic flux due to responsive change of excitation of coils 42, and there will be rapid torque response of the flux-concentrating rotor member 36 to change in excitation.

It will also be noted that the pole members 41 are individually mounted on pole support members 38 and 39 as opposed to prior art structures wherein the flux-concentrating members were defined in a solid core of magnetic material, or comprised flux-concentrating poles defined in a solid annular member, both of which had high inertias. The poled rotor structure disclosed has a minimum mass and a relatively low inertia which further decreases the torque response time of the rotor to change of excitation.

The eddy currents generated at the inner surfaces of drum 33 by the flux concentrations passing therethrough produce considerable heating of drum 33, particularly at low speeds of shaft 14, including zero speed when shaft 14 may be called upon to exert a holding torque on a load, or halt and hold an overhauling load. At zero speed of shaft 14, and when the coupling is braking an overhauling load, essentially all power input to shaft 7 is absorbed by drum 33 as heat.

As a further aspect of the invention, the pole ring laminations are so constructed as to provide improved cooling liquid flow in the illustrated coupling.

A liquid inlet header 53 is mounted on housing 2 and has a water inlet 54 defined therein adapted to be connected to a supply source of cooling liquid, not shown.

Apertures 55 are defined in the upper portion of housing 2 which communicate with liquid passages 56 defined in field rings 43 and 44. The passages 56 are provided by interrupting one or more of the annular plates forming the pole rings, as indicated by the annular plate 57, FIG. 2. Cooling liquid as indicated by the series of arrows 58, flows into the header 53, through apertures 55, into each of passages 56 and onto the exterior surface of the drum 33 under all the pole rings 43 and 44. The cooling liquid clings to the drum and absorbs heat therefrom until thrown off the drum when it runs down to the bottom of the machine, into sump 59 and is discharged through opening 60. As indicated by arrows 61, some liquid may move axially off the end of the drum. It will be noted that sealing member 10 and drum support member 25 cooperate to form a labyrinth seal to prevent this cooling liquid from entering bearing cavity 19. Likewise, sealing member 17 and drum support member 28 cooperate to form a labyrinth seal to prevent liquid from entering bearing cavity 13. Cooling liquid which is thrown off of the drum will run down the channels defined between the coils 42 and pole rings 43 and 44 and out through discharge opening 60.

A liquid deflector 62 may be mounted on rings 43 and/or 44 at the lower portion thereof to deflect liquid, as indicated by arrows 63 and 64, in the channels defined by the pole rings and coils into aligned passages 65 defined in the annular laminated plates forming pole rings 43 and 44.

In the illustrated machine, means including orifice 66, conduit 67, spout 68, trough 69, and openings 70 in drum support brackets 26 and 27 are provided at each end of the machine for introducing a metered flow of cooling liquid onto the interior surface of drum 33. This structure is fully disclosed and claimed in the copending application of Edgar F. Russell, Serial No. (20D–651), filed on the same date as this application and assigned to the same assignee as the present application.

An eddy current coupling embodying the invention disclosed in this application has an improved torque time response to change in excitation. The particular coupling illustrated has been utilized in an application previously reserved for direct current motors; specifically, two such couplings have been used in combination with a diesel engine prime mover to provide hoist and drag functions for large power shovels. In this application the disclosed coupling has shown the flux and torque response to change in excitation necessary to achieve the required functions of speed and also safety. The factor of safety is quite important as related to lowering, stopping and holding an overhauling load such as a large shovel bucket.

While the invention has been disclosed in one embodiment thereof, chosen for purposes of disclosure, other embodiments of and modifications to the disclosed invention may occur to those skilled in the art which do not depart from the spirit and scope of the invention. Accordingly, it is intended to cover in the appended claims all modifications and embodiments of the invention which do not depart from the spirit and scope of the invention.

What is claimed as new and is desired to secure by Letters Patent of the United States is:

1. An eddy current coupling comprising a housing member, axially aligned shafts rotatably supported in said housing member, a toroidal exciting coil within said housing, an annular pole ring on either side of said exciting coil arranged to conduct magnetic flux produced by said coil, said pole rings comprising a lamination of magnetic plates presenting an annular laminated pole surface, an eddy current drum of magnetic material having an outer peripheral surface adjacent said laminated pole surfaces and defining gaps therebetween, said drum being mounted on one of said shafts for rotation therewith, a rotor member comprising a hub portion mounted on the other of said shafts for rotation therewith and having radially extending pole-supporting means, and a plurality of circumferentially spaced longitudinally extending flux-concentrating poles carried by said pole-supporting means, said poles comprising laminations of plates of longitudinally oriented magnetic material and having outer surfaces defining gaps between said poles and the inner surface of said drum.

2. An eddy current coupling comprising an annular housing member, axially aligned shafts rotatably supported in said housing member, a toroidal exciting coil within said housing, an annular pole ring on either side of said exciting coil arranged to conduct magnetic flux produced by said coil, said pole rings comprising a lamination of magnetic plates presenting an annular laminated pole surface, an eddy current drum of magnetic material having an outer peripheral surface adjacent said laminated pole surfaces and defining gaps therebetween, said drum being mounted on one of said shafts for rotation therewith, at least one of said plates forming each pole ring having an interruption therein providing a vertical passage through said ring, a liquid inlet header on said housing at the upper portion thereof, an aperture in said housing providing communication from said header to said passage whereby cooling liquid may be introduced onto the outer surface of said drum through said passage, a rotor member comprising a hub portion mounted on the other of said shafts for rotation therewith and having radially extending pole-supporting means, a plurality of circumferentially spaced longitudinally extending flux-concentrating poles carried by said pole-supporting means, said poles comprising laminations of plates of longitudinally oriented magnetic material and having outer surfaces defining gaps between said poles and the inner surface of said drum.

3. An eddy current coupling comprising an annular housing member, axially aligned shafts rotatably supported in said housing member, a toroidal exciting coil within said housing, an annular pole ring on either side of said exciting coil arranged to conduct magnetic flux produced by said coil, said pole rings comprising a lamination of magnetic plates presenting an annular laminated pole surface, an eddy current drum of magnetic material having an outer peripheral surface adjacent said laminated pole surfaces and defining gaps therebetween, said drum being mounted on one of said shafts for rotation therewith, at least one of said plates forming each pole ring having an interruption therein providing a vertical passage through said ring, a liquid inlet header on said housing at the upper portion thereof, an aperture in said housing providing communication from said header to said passage whereby cooling liquid may be introduced onto the outer surface of said drum through said passage, said pole rings having axially directed apertures therethrough in the bottom portion thereof to allow liquid to exit from channels defined between said coil and said pole rings, a rotor member comprising a hub portion mounted on the other of said shafts for rotation therewith and having radially extending pole-supporting means, a plurality of circumferentially spaced longitudinally extending flux-concentrating poles carried by said pole-supporting means, said poles being individually supported on said pole-supporting means.

4. An eddy current coupling comprising an annular housing member, axially aligned shafts rotatably supported in said housing member, a toroidal exciting coil within said housing, an annular pole ring on either side of said exciting coil arranged to conduct magnetic flux produced by said coil, said pole rings comprising a lamination of magnetic plates presenting an annular laminated pole surface, an eddy current drum of magnetic material having an outer peripheral surface adjacent said laminated pole surfaces and defining gaps therebetween, said drum being mounted on one side of said shafts for rotation therewith, at least one of said plates forming each pole ring having an interruption therein providing a vertical passage through said ring, a liquid inlet header on said housing at the upper portion thereof, an aperture in said housing providing communication from said header to said passage whereby cooling liquid may be introduced onto the outer surface of said drum through said passage, said pole rings having axially directed apertures therethrough in the bottom portion thereof to allow liquid to exit from channels defined between said coil and said pole rings, a rotor member comprising a hub portion mounted on the other of said shafts for rotation therewith and having radially extending pole-supporting means, a plurality of circumferentially spaced longitudinally extending flux-concentrating poles carried by said pole-supporting means, said poles comprising laminations of plates of longitudinally directed magnetic material and having outer surfaces defining gaps between said poles and the inner surface of said drum.

References Cited by the Examiner

UNITED STATES PATENTS

| | | | |
|---|---|---|---|
| 2,341,171 | 2/1944 | Alessandri | 310—155 |
| 2,428,104 | 9/1947 | Winther | 310—105 |
| 2,521,535 | 9/1950 | Potts | 310—93 |
| 2,864,015 | 12/1958 | King | 310—105 X |
| 2,906,900 | 9/1959 | Cohen | 310—101 |
| 3,054,007 | 9/1962 | Munson | 310—54 X |

MILTON O. HIRSHFIELD, *Primary Examiner.*

DAVID X. SLINEY, *Assistant Examiner.*